Dec. 20, 1927.

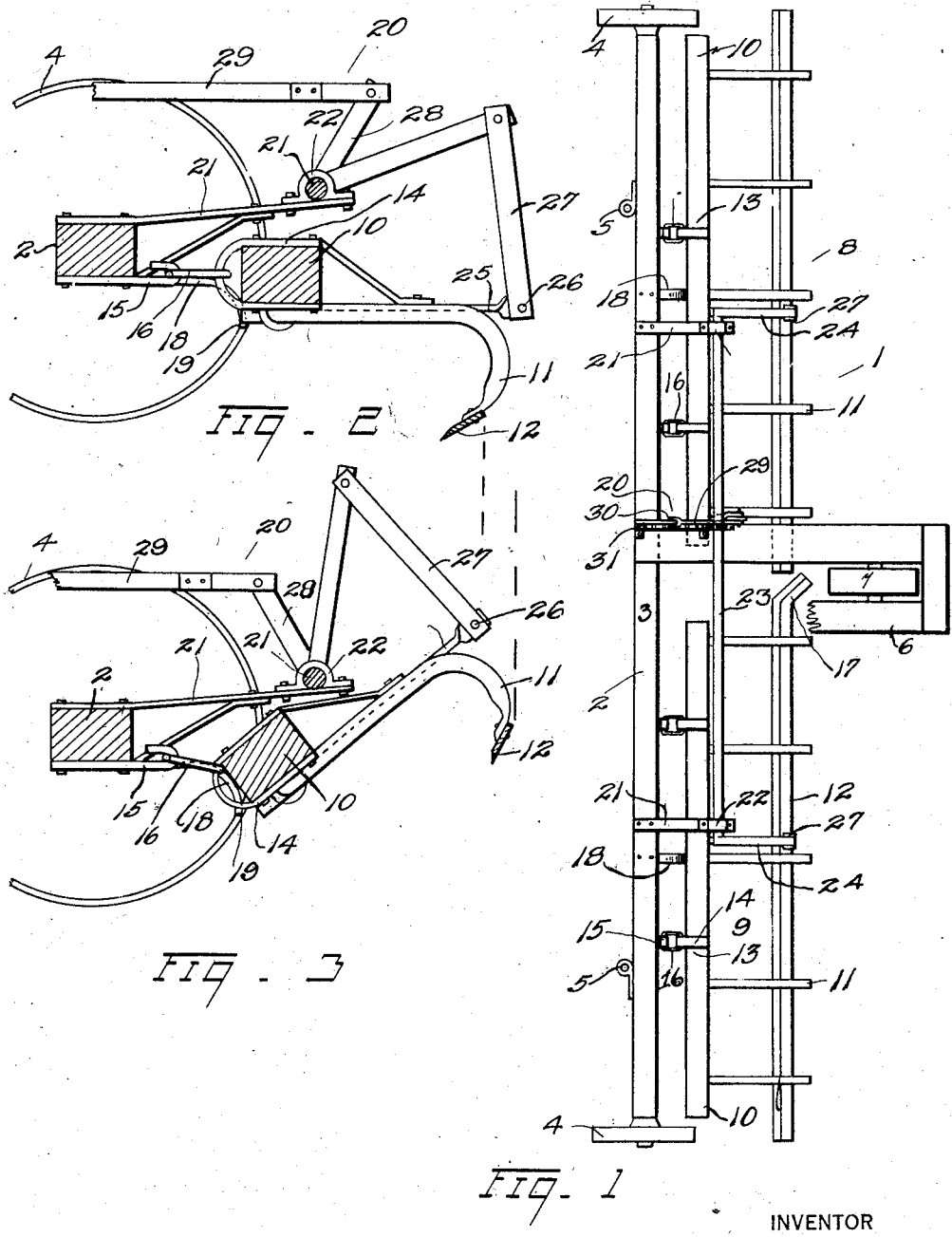

J. F. SNIDER 1,653,518

WEEDER

Filed July 29, 1926      2 Sheets-Sheet 2

INVENTOR
John F. Snider
BY
ATTORNEY

Patented Dec. 20, 1927.

1,653,518

UNITED STATES PATENT OFFICE.

JOHN F. SNIDER, OF WESTON, OREGON.

WEEDER.

Application filed July 29, 1926. Serial No. 125,685.

This invention relates to weeders and has as one of its objects to provide a weeder that will automatically adapt itself to uneven ground.

Another object of the invention is to provide a weeder having its parts arranged for close coupling to reduce the drag of the third wheel to a minimum when turning corners.

A further object of the invention is to provide a weeder that utilizes the close coupling arrangement to provide great flexibility.

A further object of the invention is to provide a weeder having a dumping means that is easily operable due to the close coupling arrangement.

With these and other objects in view reference is now had to the accompanying drawings in which—

Fig. 1 is a plan view of a weeder;

Fig. 2 is a vertical section of a weeder showing the cutting blade in an operable position;

Fig. 3 is a vertical section of a weeder showing the cutting blade raised for cleaning;

Figure 4:
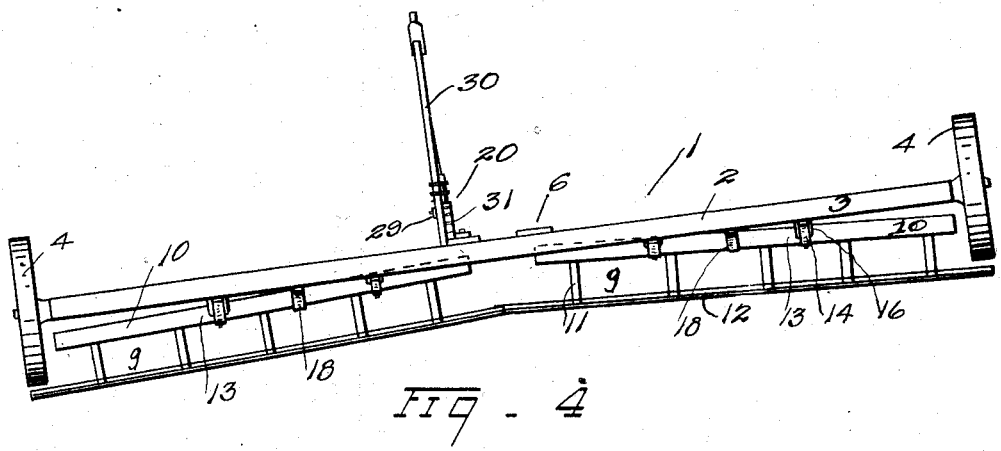
Fig. 4 is a front elevation of a weeder.

Having reference to the drawings like numerals refer to like parts throughout the several views and the numeral 1 refers to a weeder, of the flexible slicker type, consisting of a frame 2 comprising a single continuous beam 3, extending laterally and mounted on vehicle wheels 4, and having rings 5 on its forward side for draft purposes, the draft means being not shown as such means is old in the art and has no bearing on this invention.

Rigidly attached to the frame 2 and centrally positioned thereon is an extension 6 projecting rearwardly from the frame, the extension being supported at its rearward end by a third wheel 7.

This extension is of the nature of the usual platform, and may be utilized to support a seat (not shown) in the usual manner if desired, its difference however lies in the fact that the third wheel 7 is coupled closely to the frame member so that on turning corners the center of the third wheel will be as near as practicable to the center line of the frame wheels 4 that there will be very little side draft to this wheel as it moves in a circle around one of the vehicle wheels as a pivot.

Attached to the frame 2 in a manner to be explained is a flexible weed cutting mechanism 8 consisting of a plurality of weeder sections 9, each of these sections consisting of a laterally extending bean 10 positioned in parallel relationship with the frame, to which goosenecks 11 are attached, with cutting blades 12 rigidly secured to the bottom part of the goosenecks in the usual manner.

The weeder sections 9 are adjustably attached to the frame 2 in a manner to provide for extreme flexibility, for both vertical and lateral movement, and the attaching means consists of a loose link connection 13 comprising a pair of clevises 14, referably attached to the beam 10 of the sections, hooks 15 attached to the frame, and these two parts joined detachably by means of links 16, with the connections being spaced apart on the beam to automatically provide for the above mentioned free lateral movement of the sections and at the same time to provide a close coupling of the parts whereby to conserve distance and with the comparatively short goosenecks to further conserve distance by bringing the blades 12 forward and thus to provide room for and to avoid the closely coupled third wheel 7.

To perfect the connection whereby the free lateral movement of the sections may obtain, and maintain the sections in parallel relation to the frame, with a view to preventing the inner end 17 of the weeder blades 12 entangling with the closely coupled third wheel 7 a pivotal guide bar 18 is provided that is rigidly attached to the frame 2 and positioned between the frame and the sections, and this pivotal guide bar has a curved end 19 that is positioned to register contiguous to said beam, to provide a joint upon which the beam may play during operation of the weeder on uneven ground.

This guide bar 18 is arranged to contact the beam when that member is in the normal position with the blade in the ground, in which position the weight of the beam 10 of the weeder section in its natural inclination to slide down the curved end by gravity will maintain the link connection 13 taut forming a rigid link connection from a loose link connection without in any way impairing the flexibility of the weeder sections as to their automatic lateral adjustment.

Adjustment of the sections in a vertical plane is accomplished by means of an adjusting or operating means 20 to be explained and in explaining this vertical adjustment reference is had to Fig. 2 which shows the normal position of the weeder when the blade is in the ground and to Fig. 3 which shows the position of the blade and also the position of the beam 10 of the section when the blade is raised.

By observing Figs. 2 and 3, taken for the moment in combination, broken lines extending from the cutting blades 12 of both figures will be noted and the distance between these lines represents the extreme movement in the arc of travel of the blade during adjustment which movement is restricted or shortened due to the beam 10 dropping down and thus changing its pivotal center during the adjusting operation. It will thus be noted that by automatically changing the location of the pivotal point with respect to the beam that the weeder blade, although its end may be offset to pass the adjacent blade as shown in Fig. 1, may be positioned close to the third wheel 7 and still avoid that member during the adjustment of the sections.

Adjustment of the blade is accomplished by the adjusting means 20 as above mentioned and this adjusting means comprises rearwardly extending bars 21 rigidly attached to the frame and carrying journals 22 on their rearward ends, in which is mounted a rockable cross shaft 23 having its ends 24 normally extending rearwardly. The beam 10 has also a rearwardly extending bar 25, similar in design to the first mentioned bar, and is provided on its outer or rearward end with a pivotal connection 26, and a connecting link 27 connects with this pivotal connection and with the said end of the cross shaft. An arm 28 is then brought upward from the rock shaft 23 and a connecting rod 29 is pivotally connected to the arm, with its forward end similarly connected to an operating lever 30 mounted in operable conjunction with a quadrant 31 rigidly secured on the extension.

Now by moving the operating lever forward obviously the rock shaft will be partly rotated and this movement will rock the beam of the section on the pivotal guide bar, which dropping thereon as above mentioned, will act as a counterbalance moving on the above mentioned pivotal point to aid and assist in the operation of raising the blade, and as the blade cannot now extend unduly rearwardly the movement of the blade will not interfere with the third wheel, to prevent its close coupling to the frame.

The weeder sections, by means of the pivotal guide bar 18 are held taut in their connection to the frame and thus a regular movement of the blade and adjustment obtains during adjustment, and by the addition of the pivotal guide bar it is obvious that the beam is universally attached to the frame, that its vertical adjustment is accomplished manually, and that its lateral adjustment is automatic.

It will be noted by referring to Fig. 4 that a solid single beam frame may be utilized without interfering with the movement of the weeder sections during adjustment, and that the movement thereof is extremely flexible as shown in this figure, irrespective of the solid beam.

In use the weeder is drawn over the ground in the usual manner and on turning corners the horses are driven around a quarter circle as with any other implement, when the third wheel follows without material side draft.

The blades of the weeder sections are now dropped to their normal positions in the ground by dropping the operating lever rearward, this movement rocking the weeder beam with one of its corners in contact with the curved part of the pivotal guide bar, and the weight of the beam while in this position now pulls the beam rigidly against the loose link connection and maintains the weeder blade in its fixed normal position parallel to the frame.

Now to change positions or to transport the weeder, or to dump and clean the blade the operating lever is advanced on the quadrant which partly rotates the rock shaft, the rock shaft in turn acting on the beam of the weeder sections through the link 27 so that the beam now slides downward on the pivotal guide bar, the clevis likewise dropping until the link of the loose link connection has reached the extreme uppermost portion of the clevis 14 when a complete and rapid movement of the blade occurs out of the ground with the blade being lifted almost vertically from its normal position.

The weeder is now transported and the blade dropped to its normal position for use as before.

Figure 5:
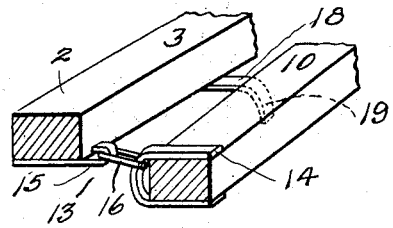
Fig. 5 is a perspective view of a fragment of the beams of a weeder showing the relative position of the coupling link and the pivotal guide bar.
Figure 6:
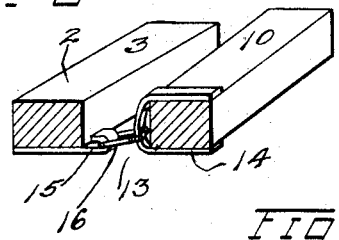
Fig. 6 is a similar view of Fig. 5 showing the coupling link in a different position.

Attention is called to Figs. 5 and 6, in Fig. 5 of which the pivotal guide bar is clearly shown and in which is illustrated the pivotal movement described, of the beam on the guide bar, and the relative position of the link at one end of the beam as described above, with, in Fig. 6, the position of the link being shown in the opposite position to that shown in Fig. 5.

I claim—

1. In a weeder, a frame mounted on vehicle wheels, a pivotal guide bar attached to said frame, and weeder sections adjustably attached to said frame and mounted for slidable and pivotal movement about said guide bar.

2. In a weeder, a single beam frame mounted on vehicle wheels, weeder sections carrying weeder cutting blades attached to said frame, and having means to provide for an automatic pivotal movement to said blades, said means comprising a pivotal guide bar attached to said frame and positioned contiguous to said sections, and means to adjust said sections.

3. In a weeder, a frame comprising a beam and a platform mounted on vehicle wheels, weeder sections carrying cutting blades adjustably attached to said frame, and having means to provide for an automatic adjustment to said blades, said means comprising a curved pivotal guide bar attached to said frame and positioned centrally to said sections, and means to adjust said sections.

4. In a weeder, a frame comprising a single beam and a platform extending rearwardly therefrom, and mounted on vehicle wheels, weeder sections carrying cutting blades and adjustably attached to said frame, and means to provide for automatic pivotal adjustment of said sections, said means comprising a curved pivotal guide bar rigidly attached to said frame and extended to bear centrally against said sections, and means to adjust said sections.

5. In a weeder, a frame comprising a single beam mounted on vehicle wheels, and a platform extending rearwardly therefrom and mounted on a third wheel, weeder sections consisting of a beam and a cutting blade attached to said beam, said sections being adjustably and detachably attached to said frame, and means to provide for automatic pivotal adjustment of said sections, and to support said beam during adjustment, said means comprising a pivotal guide bar attached between said frame and sections in a position contiguous to said sections, and means to adjust said sections.

6. In a weeder, a frame comprising a single beam mounted on vehicle wheels and having a rearward extension mounting a third wheel closely coupled to said frame, weeder sections consisting of a beam and a cutting blade attached to said beam, said sections being detachably attached to said frame, and adjustable in a vertical plane with loose link connection, and means to provide for automatic pivotal adjustment of said sections and to support said beam during vertical adjustment, said means comprising a curved pivotal guide bar regularly attached to said frame and extended to bear centrally against and beneath said sections, and means to adjust said sections.

In testimony whereof I affix my signature.

JOHN F. SNIDER.